United States Patent [19]
Heck

[11] 3,816,112
[45] June 11, 1974

[54] METHOD OF COATING STEEL PLATES WITH SINTERED FRICTION LAYERS
[75] Inventor: Friedrich Heck, Deilinghofen-Brockhausen, Germany
[73] Assignee: Duria-Werk Karl Kempf KG, Neuss/Rhein, Germany
[22] Filed: Nov. 5, 1971
[21] Appl. No.: 196,094

[30] Foreign Application Priority Data
 Nov. 5, 1970 Germany............................ 2054335

[52] U.S. Cl................ 75/208 R, 29/182.3, 75/200, 75/221
[51] Int. Cl. ........................... B22f 5/00, B22f 7/02
[58] Field of Search................. 75/208 R, 200, 221; 29/187.3, 420.5

[56] References Cited
UNITED STATES PATENTS
| | | | |
|---|---|---|---|
| 2,161,597 | 6/1939 | Swartz | 75/208 R |
| 2,178,527 | 10/1939 | Wellman | 75/208 R X |
| 2,260,247 | 10/1941 | Darby et al. | 75/208 R X |
| 2,381,941 | 8/1945 | Wellman et al. | 29/182.3 X |
| 2,945,291 | 7/1960 | Ankeny et al. | 29/182.3 X |
| 3,037,860 | 6/1962 | Masterson et al. | 29/182.3 X |
| 3,139,671 | 7/1964 | Herron et al. | 29/182.3 |
| 3,684,498 | 8/1972 | Heck | 75/208 R |

Primary Examiner—Leland A. Sebastian
Assistant Examiner—R. E. Schafer
Attorney, Agent, or Firm—Toren and McGeady

[57] ABSTRACT

Method of coating a steel plate having upper and lower surfaces with layers of sintered friction material on both surfaces. The method comprises the following steps:
 a. adhering a layer having a rough, intermeshing surface on one of said upper and lower surfaces;
 b. placing the steel plate with said layer pointing downwardly onto a mold having a mold cavity filled with particles of friction material so that said layer contacts the uppermost of said particles;
 c. applying, in loose formation, a layer of particles of friction material on the other one of said surfaces;
 d. jointly sintering said particles of friction material within said mold cavity and on said other one of said surfaces to form first and second coatings of sintered material on said surfaces;
 e. removing said mold; and
 f. jointly compressing said first and second coatings to a desired thickness.

14 Claims, 15 Drawing Figures

METHOD OF COATING STEEL PLATES WITH SINTERED FRICTION LAYERS

FIELD OF INVENTION

The invention is concerned with methods for the production of steel disks or plates — hereinafter referred to as steel plates — which are coated on both sides with layers of sintered friction materials, wherein friction material in powder form is first applied to the respective surface of the steel plate and is then sintered and compacted. The invention is particularly concerned with steel plates of the indicated kind which have inner and outer gear rims.

BACKGROUND INFORMATION AND PRIOR ART

A number of procedures have been developed for coating steel plates on both sides with sintered friction materials. In these prior art procedures, the friction material in powder form is first sprinkled on or spread over the upper surface of the steel plates by means of suitable dosage devices whereupon the powder layer thus formed is sintered. The plate is then turned by 180° so that the initially lower side now points upwardly whereupon the procedure is repeated and the now upper surface is covered with the friction material in powder form, whereupon the powder is sintered. These prior art procedures have the disadvantage that the sintering has to be effected in two stages, to wit each side of the plate has to be sintered separately.

Prior to this invention, it has not been feasible to employ the known technology of coating simultaneously both sides of a flat, planar structure with thin uniform layers by first spreading sinter powder on the upper and lower surfaces of the structure and subsequent sintering. This is so because the direct contact of the metallic powder particles with the surface of the structure to which the powder is to be sintered, as required for the formation of a satisfactory sintered layer, could not be accomplished in respect to the downwardly pointing face of the structure. This essential condition for forming a satisfactory sinter layer in sintering metallic friction powders to steel carriers is only partially fulfilled if the steel carrier or plate is placed on top of the powder layers. If this is done, direct contact between powder and carrier is limited to certain areas while at other areas there is a space or gap between the powder particles and the carrier surface. At those areas at which during the subsequent sintering there is direct contact between powder particles and steel surface, a sinter or solder-like connection is attained, whose formation is facilitated by the interposition of a rough intermediate layer. However, no sinter connection is formed at the "in between" areas in which the respective powder particles do not engage the surface of the carrier plate. Considering that from a practical point of view the carrier plates normally are not completely plane, the areas at which no direct contact between powder particles and carrier surface is established are rather numerous, thus resulting in an unsatisfactory product. If the carrier plate would be completely plane then, of course, direct contact between the powder particles and the carrier surface would be assured over the entire area. However, from a practical point of view this requirement cannot be fulfilled.

SUMMARY OF THE INVENTION

It is a primary object of the invention to provide a method for coating steel plates on both sides with layers of sintered materials which overcomes the prior art disadvantages and results in layers of superior characteristics which adhere to the steel surface in exceptionally excellent manner.

It is also an object of the invention to provide a process of the indicated kind which can successfully be carried out with steel plates having inner and/or outer gear rims.

Another object of the invention is to provide a process of the indicated kind wherein the layer formation on the upper and lower faces of the steel plate is accomplished simultaneously.

Still a further object of the invention is generally to improve on the art of coating steel plates with sinter layers, as presently practiced.

Briefly, and in accordance with one embodiment of the invention, a steel plate may be simultaneously coated on both sides by adopting the following measures:

a. First a solid rough layer is adhered to that side of the steel plate which normally faces downwardly;

b. a mold having a mold cavity corresponding to the dimension of the surface of the steel plate to be coated is filled with sinter material in powder form, the amount of the powder in the form corresponding to the amount of sinter material to be applied to the respective surface of the plate.

c. the steel plate with the rough layer adhered thereto is now placed onto the mold containing the sinter powder;

d. a uniform layer of sinter powder in an amount corresponding to the ultimately desired amount is now placed on the upper surface of the steel plate which, if it carries gear rims or the like, is covered at those portions.

e. the two powder layers, to wit the one on the upper surface and the one bearing against the lower surface are then jointly sintered whereupon f. the mold is removed and the two sinter layers formed are jointly compacted or compressed in a manner known per se to the ultimately desired thickness.

If necessary a post sintering and calibration procedure may thereafter be effected.

In respect to the formation of the rough intermediate layer of a step a the invention proposes to form this layer by first applying a film of fluxing agent onto the carrier plates whereupon the rough intermediate layer proper is formed by sprinkling a granular or porous material such as bronze powder on the fluxing film. Thus, the intermediate layer of bronze powder has intermeshing characteristics, to wit, it has a tendency to interlace and tangle with the metallic sinter powder subsequently applied. The film of fluxing agent may be formed from a solution of borax and/or fluoro compounds such as are used during hard soldering for the purpose of removing metal oxides. By wetting the respective steel surface with such a solution and then sprinkling the intermediate layer-forming powder, the latter is adhesively adhered to the steel surface since the fluxing agent, upon drying forms an adhesive film. The intermediate layer which, as previously stated, may comprise bronze powder, is preferably formed by a granulate in powder form comprising bronze powder of 85 percent copper and 15 percent tin of particle size of about 0.15 mm. The intermediate layer-forming powder should be applied in uniform manner to form a very thin coating. The initially liquid film of fluxing material which thus forms an adhesive base in which the bronze powder is anchored prevents that the relatively thin rough intermediate layer or the particles of the layer fall off when the plate is turned for placement onto the mold. The density of the intermediate layer, as has been ascertained by practical experiments should preferably be 3–4 g/dm$^2$. Due to the at least partially dry fluxing agent film having adhesive properties, the rough intermeshing intermediate layer is securely held on the steel carrier surface. This applies also during the subsequent sintering procedure. The adhesive film is originally upon partial drying crystalline and once the temperature rises during the sintering procedure it turns into a highly viscous fluxing film capable of adhesively holding the powder particles at its adhesive surface until the powder particles of the sinter powder have become fused or united and a sintered structure composed of the steel carrier, the metallic particles of the intermediate layer and the metallic sinter layer proper has been formed.

The invention is based on the realization that the metallic powder particles of the sinter powder, which are accommodate within the mold cavity of the mold, contact during the sintering proper the steel carrier at a few areas only. The intermeshing, rough intermediate layer is created for the in between areas which intermediate layer thus facilitates the formation of a superior sintered structure throughout. After the sintering and forming, the intermediate layer can be compacted and compressed with the sinter layer proper without in any way negatively affecting the final result.

The problem of direct contact between the metallic powder particles of the sinter powder and the surface of the steel plate does not occur at the top or upper side of the plate since the metallic powder particles, due to their weight, conform to the unevennesses of the steel plate so that contact between the metallic powder particles and the steel plate surface is substantially assured over the entire surface. However, it is also within the scope of the present invention to provide, if desired, a rough intermeshing intermediate layer on the upper steel plate surface as well.

The subsequent compacting or compressing of the friction material layers, which are sintered onto the steel plate surfaces in porous manner, is well known in the art. The compaction or compression procedure accomplishes mechanical connection and fusion between the still open areas of the composite in desired manner. The mechanical connection or bonding at these open areas is facilitated by choosing a pore size for the rough intermediate layer which is at least equal or larger than the average particle size of the metallic friction material particles. It is an essential characteristic of this mechanical bonding press technique that the rough structure of the intermediate layer corresponds to a loosely painted powder layer exhibiting typical entangling properties for porous or intermeshing powders.

In order to obtain satisfactory uniformity and evenness of the sintered layers, it is necessary that the metallic friction material particles are applied to the mold and the upper surface of the steel plate by means of suitable dosage devices well known in the art. In this manner a uniform, predetermined layer thickness can be obtained and the amount of powder to be applied corresponds to the ultimately desired thickness of the respective coatings or layers. In this manner it is successfully prevented that the coating or layer has to be ground down prior to use.

By using a mold in the manner indicated, any desired rim or surface configuration of the coating can be accomplished. It is merely necessary to adapt the shape of the mold cavity of the mold accordingly. In order to be able to exactly determine the form of the coating on the upper side of the plate, the plate is covered in the region of the gear rims which are not to be coated. The covering, of course, at the same time influences the edge formation of the layers to be formed. After the covering has been removed, the natural angle of repose will adjust itself. In order to avoid this, the invention proposes, according to an additional embodiment that for the purpose of coating the upper side of the steel plate the friction material in powder form is also inserted into a mold in knock-resistant manner. The plate, with its upper surface is then placed onto the mold containing the friction particles whereupon mold and plate are turned about 180° and the removal of the mold is effected in an upward direction. If desired a rough intermediate layer of the kind previously indicated may be applied to the upper surface of the steel plate before it is placed on the mold. In this manner it is possible to obtain identical layers or coatings including identical rim or edge formation on both sides of the steel plate.

Experiments have indicated that excellent results are obtained if the mold is made of sheet material composed of chromium-nickel-iron. As compared to prior art casting molds which had to be worked on a lathe or the like in metal cutting manner prior to use and which have relatively thick walls, sheet metal molds of chromium, nickel and iron have the advantage of extremely low production costs. In addition they are heat conductive and require less heat energy during the sintering in sinter furnaces.

It has also been found that it is advantageous if the edge portions or rims of the sheet metal mold form sharp edges so that friction material powder sprinkled thereon readily falls off from the edges.

According to another feature of the invention the mold is advantageously arched upwardly throughout its bottom surface whereby a secure contact of the thus also arched powder layer against the steel plate surface is assured. If desired the bottom of the mold may have depressions or projections at different sections whereby a similar effort is obtained.

By forming the layer of friction material on the bottom side of the steel plate in the indicated manner, the advantageous possibility is created first to sinter several plates at the same time so as to form friction layers on the bottom side only. For this purpose a first metal plate having adhered thereto the intermediate rough layer previously discussed is placed on a mold containing the friction powder whereupon a second mold carrying a second plate is placed on the first plate. This procedure may be repeated until a stack of desired height has been obtained whereupon the stack can be introduced into a sintering furnace to accomplish the sintering of all the bottom layers simultaneously. After all the bottom layers of each plate have thus been sintered, simultaneous sintering of the top layers may then be accomplished in the manner previously explained.

The various features of novelty which characterize the invention are pointed out with particularity in the claims annexed to and forming a part of this disclosure. For a better understanding of the invention, its operating advantages and specific objects attained by its uses, reference should be had to the accompanying drawings and descriptive matter in which there are illustrated preferred embodiments of the invention.

BRIEF DESCRIPTION OF THE DRAWINGS

Referring now to the drawings, FIG. 1 shows a ring shaped or annular steel plate 1 which is to be coated on both sides in accordance with the inventive procedure. The steel plate 1 has an outer gear rim 12 as best seen in FIG. 12 and may also have an inner gear rim (not shown). The gear rims are not to be coated with friction material.

As seen in FIG. 2, the upwardly pointing face of the steel plate 1 is first coated with an aqueous solution of a fluxing agent to form a thin fluxing agent film 2. The fluxing agent film may be formed from an aqueous solution of borax or fluoro borate. The fluxing agent film has a tendency to form, upon drying, an adhesive film capable of retaining metal particles. However, prior to drying the film a granular metal powder with a particle size of up to about 0.1 mm is sprinkled onto the film in an amount corresponding to about 3 to 4 g/dm$^2$. This metal powder may, as previously set forth, be bronze powder consisting of about 85 percent of copper and 15 percent of tin. If desired the size of the particles may be up to about 0.15 mm. This metal powder forms an intermediate layer 3 as seen in FIG. 3 which has intermeshing or entangling properties and thus a rough, uneven surface as clearly seen from FIG. 3. After at least partial drying the layer 3 securely adheres to the plate 1 due to the provision of the adhesive film 2.

Figure 5:
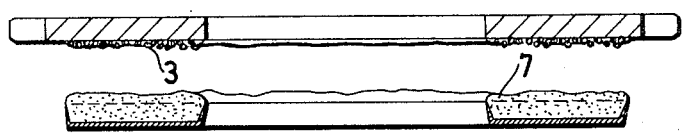
FIG. 5 shows the steel plate of FIG. 3 after it has been turned about 180° so that the initially top surface is now the bottom surface, and also shows the mold of FIG. 4 after it has been filled with metallic particles forming the ultimate friction layer.

The plate is then turned about 180° so that the rough intermediate layer 3 points downwardly as seen on top of FIG. 5.

Figure 1:
FIG. 1 is a cross-sectional view of a steel plate prior to coating.
Figure 2:
FIG. 2 shows the steel plate of FIG. 1 after the fluxing agent film has been applied to the top surface of the plate.
Figure 3:
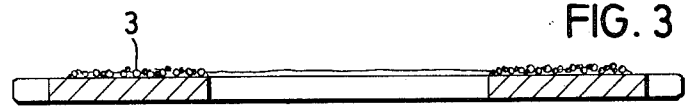
FIG. 3 shows the steel plate of FIG. 2 on which intermediate layer-forming bronze powder has been sprinkled.
Figure 4:
FIG. 4 is a cross-sectional view through an empty mold to be used in the method of the invention.

A mold to be used in the procedure is shown in FIG. 4. The mold is of sheet metal preferably of nickel-chromium-iron sheet metal and defines a mold cavity 4 with slightly slanted edge or rim portions 5. The upper edge of the rim portions 5 is sharpened or pointed as indicated by reference numeral 6. Metallic friction material in powder form capable of being sintered is now poured into the mold cavity 4 as seen in FIG. 5. The amount of powder corresponds to the amount with which the respective surface is to be coated. However, the height of the powder in the mold is about two to three times as great as the ultimate thickness of the coating. The powder which is filled into the mold by suitable dosage devices is thus in loose or porous condition in the mold cavity and projects upwardly from the mold by an amount corresponding to about 0.2 times the height of the mold.

Figure 6:
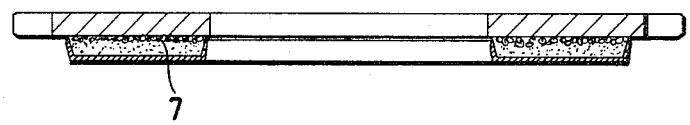
FIG. 6 corresponds to FIG. 5 with the steel plate being placed on top of the mold filled with the powder.

Turning now to FIG. 6 it will be noted that the steel plate is placed on the metal particles in the mold so that the rough intermediate layer contacts and intermeshes with the particles projecting above the plane of the mold. The powder of friction material in the mold cavity 4 is indicated by reference numeral 7 and is thus slightly compressed by the weight of the plate placed on the mold.

Figure 7:
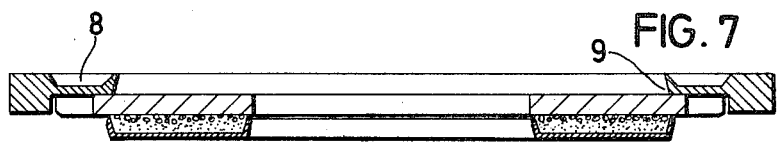
FIG. 7 shows the next step of the procedure in which the top surface of the steel plate is covered to prevent coating of undesired areas.
Figure 8:
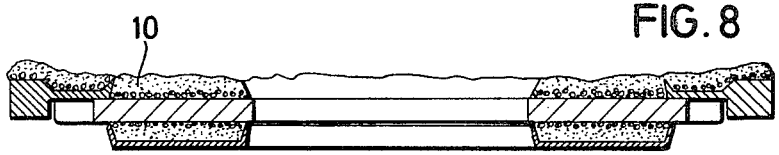
FIG. 8 shows the covered steel plate after sinter powder forming the friction layer has been spread over the top surface of the plate.
Figure 9:
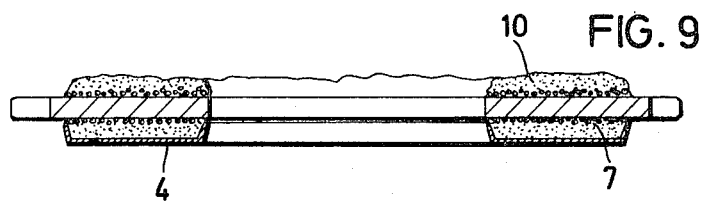
FIG. 9 corresponds to FIG. 8 after the covering has been removed.
Figure 10:
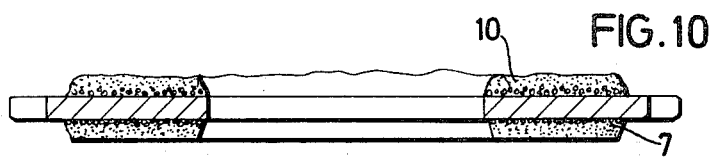
FIG. 10 shows the sintered plate after the sintering.
Figure 11:
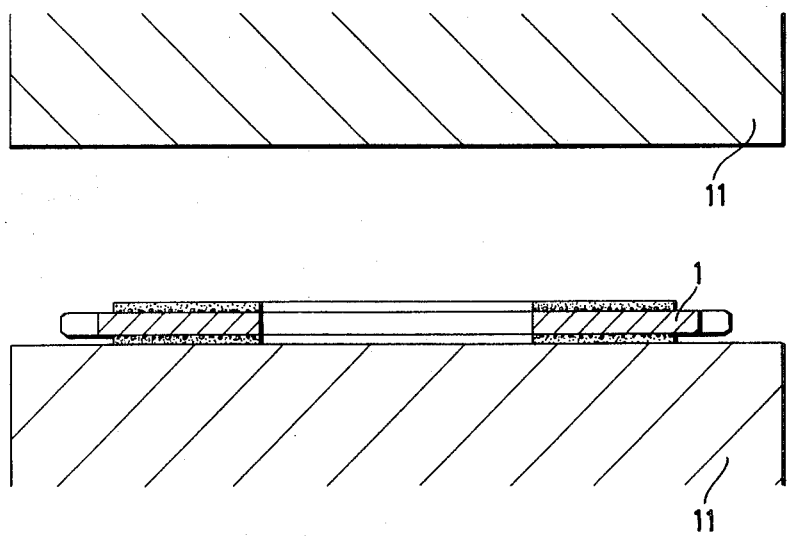
FIG. 11 shows the sintered plate after compression in a press tool.

Referring now to FIG. 7 it will be noted that an annular cover 8 is placed on the now upwardly pointing surface of the plate to shield the outer gear rim of the plate. The cover 8, however, leaves free an annular surface for application of metallic friction particles. By means of suitable dosage devices, the friction material powder layer 10 is now applied, as seen in FIG. 8. The amount of the powder spread over the top surface of the plate corresponds of course to the amount ultimately to be contained in the layer. After removal of the cover 8 (see FIG. 9) the powder layers 10 and 7 are now sintered jointly to the steel plate 1 (see FIG. 9) whereupon the mold 4 is removed (see FIG. 10). The sintered plate obtained in this manner is then inserted into a press 11 as indicated in FIG. 11 and is compacted and compressed until the top and bottom layers have the desired thickness and density. If necessary post sintering and calibration can thereafter be effected.

Figure 12:
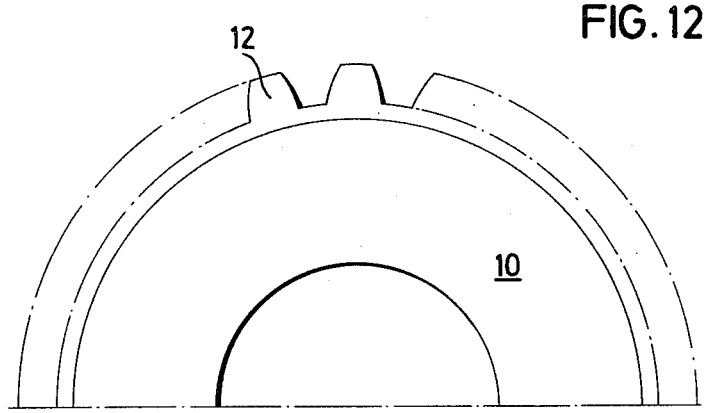
FIG. 12 is a plan view of the coated plate showing its outer gear rim.
Figure 13:
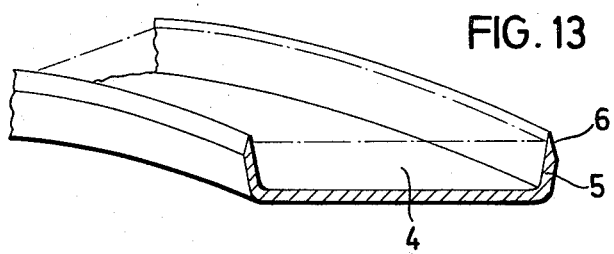
FIGS. 13–15 are perspective elevations of different embodiments of molds.

FIG. 12 is a plan view of a finished steel plate showing the top coating 10 and the uncoated or uncovered gear rim 12.

It will be appreciated that the described procedure may be varied in respect to the timely sequence of the various steps. Further, it will also be appreciated that the rough intermediate layer can be applied in a different way, for example, by flame spraying.

In order to obtain a coating on the top side of the plate which has a straight edge, the friction material powder can also be applied to the top surface by means of the mold as previously suggested. Thus friction material powder can be loosely inserted into a mold and the top side of the plate can be placed on the filled mold either with or without an intermediate layer as indicated in FIG. 6. The arrangement is then turned by 180°. In this manner the configuration of the sintered layer of the top side of the plate will be identical with that of the bottom side.

Figure 14:
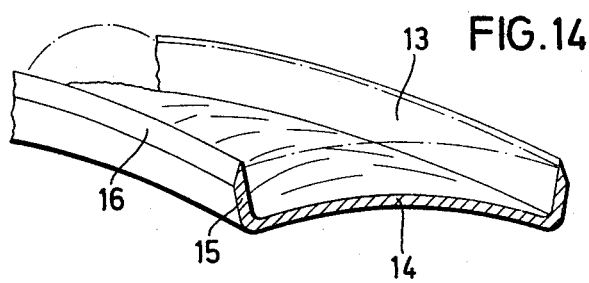
Figure 15:
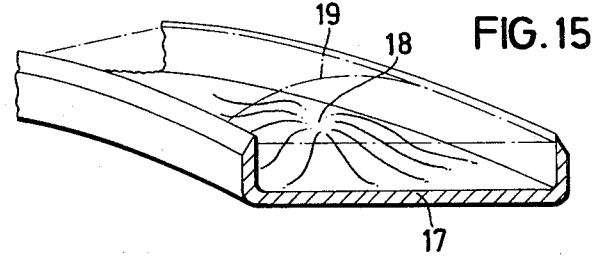

In order to make certain that the metallic friction material particles in the mold sinter to the bottom side of the steel plate in certain regions even if shrinking of the friction material layer should take place, FIG. 14 shows a mold whose bottom is arched in an upward manner. This means that if the mold is filled with friction particles with equal thickness throughout the mold cavity, the raised portion, to wit according to FIG. 14, the central arched portion 13 will in any event bear with the desired contact against the lower surface of the steel plate. If the mold cavity of the mold 14 of FIG. 14 is filled in uniform manner, the porous layer formed will of course also have an arched configuration. The rim or edge portions of this mold are indicated by reference numerals 15 and 16. For the same purpose it is possible to provide a mold which has depressions within certain regions 18 as indicated in the mold 17 of FIG. 15. In addition to depressions, projections may be provided which again will accomplish the same results. When the powder is filled into the mold the upper surfaces of the powder layer will thus correspondingly be raised or lowered.

What is claimed is:

1. A method of coating a steel plate having first and second spaced parallel surfaces with a layer of sintered friction material on said first and second surfaces, which comprises
   a. adhering a layer having a rough, intermeshing surface on one of said first and second surfaces;
   b. placing the steel plate with said layer pointing downwardly onto a mold having a mold cavity filled with particles of friction material so that said layer contacts the uppermost of said particles;
   c. applying, in loose formation, a layer of particles of friction material on the other one of said first and second surfaces;
   d. jointly sintering said particles of friction material within said mold cavity and on said other one of said surfaces to form first and second coatings of sintered material on said first and second surfaces;
   e. removing said mold; and
   f. jointly compressing said first and second coatings to a desired thickness.

2. A method as claimed in claim 1, wherein said steel plate has inner and/or outer gear rims which are not coated with friction material.

3. A method as claimed in claim 1, wherein said layer having a rough intermeshing surface is formed by first applying a liquid film or fluxing agent onto said one of said first and second surfaces where after metal powder is sprinkled onto said film.

4. A method as claimed in claim 3, wherein said fluxing agents are borax and/or fluoro borate while said metal powder is bronze powder.

5. A method as claimed in claim 1, wherein said first and second coatings are subsequently post sintered and calibrated.

6. A method as claimed in claim 1, wherein said particles of friction material are contained in said mold cavity in loose formation and project beyond the upper plane of the mold cavity to an extent corresponding to about 0.2 times the height of the mold cavity, before said steel plate is placed on the mold.

7. A method as claimed in claim 1, wherein the height of the powder in said mold cavity is about two to three times as much as the ultimate thickness of the coating.

8. A method for producing steel plates having inner and/or outer gear rims, said steel plates being coated on both sides with sintered friction layers, which comprises
   a. adhering a solid layer of rough surface configuration to at least that face of the plate which points downwardly;
   b. providing a mold having a mold cavity with an areal extension corresponding to the surface to be coated and filling the mold cavity in uniform manner with an amount of metallic friction particles, said particles extending beyond the upper plane of the mold cavity;
   c. placing the steel plate onto said mold and thus said particles with the rough layer contacting the particles extending beyond said plane;
   d. applying a uniform layer of metallic friction particles onto the opposite surface of said plate while covering said outer and/or inner gear rims;
   e. jointly sintering the metal particles in said mold cavity and on said opposite surface of said plate;
   f. removing said mold and jointly compressing the sintered particles.

9. A method of coating a steel plate with a sintered friction layer which comprises
   a. adhering a layer having a rough, intermeshing surface to one surface of said steel plate;
   b. placing the steel plate with the adhering intermeshing layer facing downwardly onto a mold cavity, said mold cavity being filled with particles of friction material;
   c. sintering said friction material onto said layer and said steel plate;
   d. removing the mold; and
   e. compressing the coating thus obtained.

10. A method as claimed in claim 9, wherein a layer of friction particles is applied to the opposite surface of said steel plate, said last mentioned layer and said particles in said mold cavity being sintered simultaneously.

11. A method as claimed in claim 9, wherein a plurality of steel plates having rough intermeshing layers adhered to one of their surfaces are placed in superimposed formation on molds having mold cavities filled with friction particles to form a stack in which the top surface of the respective steel plates supports the mold of the next higher plate, said stack of mold-plates being jointly sintered.

12. A method for coating the top side of a steel plate with a sintered friction layer which comprises pouring friction particles into the mold cavity of a mold in loose formation, placing the top side of a steel plate, while facing downwardly, onto said mold cavity, turning the plate with the mold by 180° and sintering said friction particles.

13. A method as claimed in claim 12, wherein said mold is removed, prior to sintering, in an upward direction.

14. A method as claimed in claim 12, wherein the particles in the mold cavity, prior to sintering, are compacted to a thickness which is about 0.8 the height of the particles when originally poured into the mold cavity.

* * * * *